US012649436B2

(12) United States Patent　　　(10) Patent No.:　US 12,649,436 B2
Halmheu et al.　　　　　　　　　　　　(45) Date of Patent:　Jun. 9, 2026

(54) METHOD AND SYSTEM FOR PREVENTING THE DRIVING OF AN ELECTRICALLY DRIVEN VEHICLE

(71) Applicant: AUDI AG, Ingolstadt (DE)

(72) Inventors: Rainer Halmheu, Vohburg (DE); Florian Meilinger, Egweil (DE)

(73) Assignee: Audi AG, Ingolstadt (DE)

( * ) Notice: Subject to any disclaimer, the term of this patent is extended or adjusted under 35 U.S.C. 154(b) by 219 days.

(21) Appl. No.: 17/853,498

(22) Filed: Jun. 29, 2022

(65) Prior Publication Data

US 2023/0001886 A1　　Jan. 5, 2023

(30) Foreign Application Priority Data

Jun. 30, 2021　(DE) ............................ 10202116773.6

(51) Int. Cl.
B60L 50/60　　　(2019.01)
B60R 25/045　　(2013.01)
B60R 25/32　　　(2013.01)
B60R 25/24　　　(2013.01)

(52) U.S. Cl.
CPC ............ B60R 25/045 (2013.01); B60L 50/60 (2019.02); B60R 25/32 (2013.01); B60R 25/24 (2013.01)

(58) Field of Classification Search
CPC ....... B60R 25/045; B60R 25/32; B60R 25/24; B60L 50/60
See application file for complete search history.

(56) References Cited

U.S. PATENT DOCUMENTS

| | | | | |
|---|---|---|---|---|
| 4,682,062 | A | * | 7/1987 | Weinberger ........... B60R 25/045 |
| | | | | 307/10.4 |
| 10,286,899 | B2 | | 5/2019 | Barkdull et al. |
| 2010/0007497 | A1 | * | 1/2010 | Takeda .................. B60R 25/045 |
| | | | | 340/572.1 |
| 2013/0320922 | A1 | * | 12/2013 | Acena ..................... B60L 53/14 |
| | | | | 320/109 |
| 2018/0069228 | A1 | * | 3/2018 | Pfeifer .................. B60R 25/045 |
| 2018/0186241 | A1 | | 7/2018 | Harvey et al. |
| 2018/0194332 | A1 | * | 7/2018 | Watanabe ................. B60T 7/12 |
| 2019/0023201 | A1 | * | 1/2019 | Ing ...................... H01M 10/625 |

(Continued)

FOREIGN PATENT DOCUMENTS

| | | |
|---|---|---|
| CN | 1103038 A | 5/1995 |
| DE | 19952686 A1 * | 6/2001 ............. B60R 25/04 |
| DE | 102012204788 A1 | 9/2013 |

(Continued)

*Primary Examiner* — Shelley Chen
(74) *Attorney, Agent, or Firm* — Seed Intellectual Property Law Group LLP

(57)　　　　ABSTRACT

A method is provided for preventing the driving of an electrically driven vehicle, having an electrical energy source and at least one electrical machine for a driving operation of the vehicle, between which there is arranged at least one switch, wherein electrical energy is exchanged between the electrical energy source and the electrical machine when the at least one switch is closed, includes, in the event that the driving of the vehicle is to be prevented, relaying a command designed for this purpose to a controller of the vehicle and receiving the command, by the controller, whereupon the at least one switch is opened by the controller if the vehicle is in a safe, nonmoving condition.

11 Claims, 1 Drawing Sheet

(56) References Cited

U.S. PATENT DOCUMENTS

2020/0328660 A1* 10/2020 Guo ...................... B60L 3/0084

FOREIGN PATENT DOCUMENTS

DE 102012217119 A1 * 3/2014 ........... B60R 25/045
DE 102015214303 A1 2/2017
EP 2714483 B1 * 8/2017 ........... B60W 10/18
GB 2566503 A 3/2019

* cited by examiner

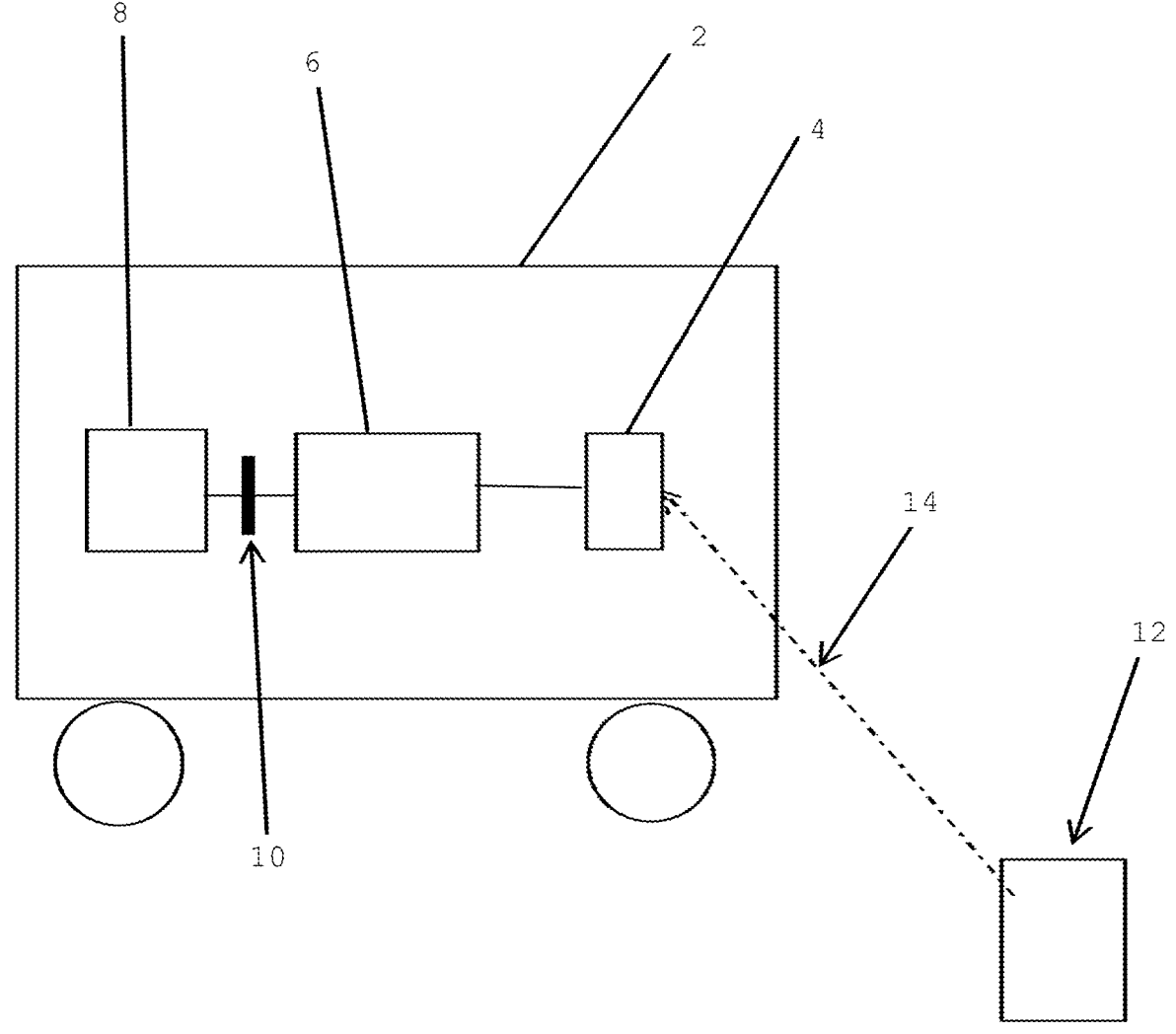

METHOD AND SYSTEM FOR PREVENTING THE DRIVING OF AN ELECTRICALLY DRIVEN VEHICLE

BACKGROUND

Technical Field

Embodiments of the invention relate to a method for preventing the driving of an electrically driven vehicle and a system for preventing the driving of an electrically driven vehicle.

Description of the Related Art

In a vehicle there are usually only two standard theft protection systems installed, namely, a central locking system and an electronic immobilizer. It is also possible to locate a stolen vehicle through GPS. However, it is entirely possible to bypass such a location by removing the corresponding GPS location system. Furthermore, a warning signal of an active alarm system can only be used when there is an assault on the vehicle. But this can be prevented by intercepting a radio signal of a radio key, so that the vehicle can be opened and started with no problem. It is furthermore possible to retrofit a vehicle with a steering wheel lock, a steering wheel claw, or a pedal lock as a theft protection system.

A method for handling a fault of a vehicle which is powered by a lithium battery is known from document US 2018/0186241 A1.

Document GB 2 566 503 A describes a method for preventing the loss of a stolen vehicle.

A control device and an onboard network system for an electronic motor vehicle are known from document DE 10 2012 204 788 A1.

Given this background, one problem to be solved was to protect an electrically driven vehicle against theft.

BRIEF SUMMARY

Some embodiments are designed to prevent the driving, for example the continued driving, of an electrically driven and/or drivable vehicle, such as a motor vehicle. This vehicle has an electrical energy source and at least one electrical machine for a driving operation of the vehicle. Between the electrical energy source and the at least one electrical machine there is arranged at least one switch. Electrical energy is exchanged between the electrical energy source and the electrical machine when the at least one switch is closed and the electrical energy source and the electrical machine are connected to each other in electrically conducting manner. In this case, driving is or can be done. If the driving of the vehicle, such as a continued driving, is to be prevented, a command designed for this purpose is relayed to a controller of the vehicle and is received by the controller. On the basis of this received command, the at least one switch is then opened by the controller, and usually only then, if the vehicle is in a safe, nonmoving condition.

In one embodiment it is provided that such a safe, nonmoving condition of the vehicle is detected and/or demonstrated by the controller. This is possible by the controller and/or sensor-supported by monitoring of kinematic parameters of the vehicle, i.e., a position, a velocity and/or an acceleration of the vehicle, if the controller is provided values for kinematic parameters from at least one sensor. If multiple switches are to be arranged between the energy source and the electrical machine of the vehicle, all the switches are closed in the driving operation and all the switches are opened to prevent the usually further driving. A detection of the safe, nonmoving condition is required in order not to endanger the safety of the vehicle or that of other road users. This prevents an opening of the at least one switch during the driving of the vehicle.

The usually continued driving of the vehicle is prevented in the context of the method in order to protect against an unauthorized and/or improper use, for example when the vehicle has been or is being stolen. In this case, the command designed to prevent driving is generated for the controller.

It is provided in one embodiment that the vehicle is in the safe, nonmoving condition if its speed is 0 or 0 km/h at least after a defined and/or definable time interval expires. It is possible for this safe, nonmoving condition to occur after the end of a movement or driving of the vehicle when it is already stationary or parked at least during a defined interval of time. The length of the interval of time can be set arbitrarily as needed.

In a further embodiment of the method it is provided that the command is relayed by radio support, e.g., transmitted, to the controller of the vehicle from a distance from the vehicle by a device external to and/or independent of the vehicle, such as a terminal device or a server, outside the vehicle, this device communicating with the controller by exchanging signals through electromagnetic waves. Once the controller has received the command, it verifies at first that the vehicle is in the safe, nonmoving condition. Only if this is the case will the at least one switch be opened. If the controller should receive the command while the vehicle is moving, the controller waits until the vehicle is in the safe, nonmoving condition at least during the predetermined interval of time, and the at least one switch is opened only then, usually after the interval of time expires.

It is provided that the electrical energy source used to supply the at least one electrical machine comprises a high-voltage system and/or is operated on a high-voltage system, which by definition amounts to at least 60 Volts, for example. The electrical energy source is configured, e.g., as a high-voltage circuit, as an onboard network with the high-voltage system, as a battery or storage cell or fuel cell. If the driving of the vehicle is supposed to be prevented, the at least one electrical machine is separated from the electrical energy source by the opened switch.

Some embodiments are designed to prevent the driving, usually the continued driving, of an electrically driven and/or drivable vehicle. This vehicle, such as a motor vehicle, comprises an electrical energy source and at least one electrical machine for its driving operation. The system comprises at least one switch and a controller, wherein the at least one switch is arranged between the electrical energy source and the at least one electrical machine as a connection element which can be opened and closed. Electrical energy is exchanged between the electrical energy source and the electrical machine when the at least one switch is closed. In the event that the driving of the vehicle is to be prevented, a command designed for this purpose is relayed to the controller of the vehicle and received by the controller. The controller of the system, and also as a component of the vehicle, is designed to receive the command provided for this purpose and to open the at least one switch on the basis of this command only if the vehicle is demonstrably in a safe, nonmoving condition.

One embodiment of the system proposed here is designed to implement an embodiment of the proposed method.

The at least one switch is designed as a contactor or corresponding load switch. It is provided in this case that the contactor or switch contactor is electrically or electromagnetically activated by the controller. The contactor is then or will be opened or closed. The switch designed as a contactor is designed for high voltages and/or heavy currents, wherein a high voltage can be applied to it and/or a heavy current can be carried through it. For the actuating of the switch with the controller, on the other hand, a signal with a low voltage and/or a low current is used.

In a further configuration of the system, it is provided that the at least one switch is arranged and contacted in an access-secured housing and/or is installed in the vehicle secure and inaccessible from the outside. It is potentially conceivable to associate the housing with an actuator which automatically opens the switch if an attempt is made to open the housing, and/or if it is damaged.

The method and the system are intended for example for an electric vehicle (battery electric vehicle, BEV) or a hybrid vehicle, such as a plug-in hybrid vehicle (PHEV). In such a vehicle, a distinction is made between the high-voltage system and a low-voltage system, the high-voltage system being used for the driving or propulsion of the vehicle.

In the method, it is provided under certain preconditions, if the vehicle is safely standing still or parked, to open the switch or switches, for example at least one high-voltage contactor, which is or are otherwise closed to perform the driving operation. The at least one switch is arranged access-secured in the vehicle and thus is not accessible from the outside. If the at least one switch is opened, a high-voltage circuit between the electrical machine and the energy source is interrupted and thus de-energized, so that the electrical machine, for example multiple electrical machines, can no longer be actuated for the driving operation. Thus, the vehicle can no longer continue to be driven. Regardless of this, the controller is connected to a battery at a low-voltage system and can thus control functions of the vehicle even independently of the energy source at the high-voltage system.

If the usually stolen electrically or at least partly electrically operated vehicle is in the safe condition for the period of time in a two-digit second range of 10, 20 or 30 seconds, for example, so that its measurable speed is zero, and in addition a brake, such as a parking brake of the vehicle is activated, the switches, such as contactors, will be opened after receiving the command and driving will be prevented. This is possible, for example, if the vehicle finds itself at a standstill during a lengthy period or duration of time at a traffic light which has turned red. If the light changes from red to green, driving of the vehicle is prevented. The same is also possible if the vehicle should be in a traffic jam at least during the interval of time.

It is possible for the possessor of the vehicle to trigger the command to prevent driving of the vehicle with a mobile portable terminal device, such as a smartphone, being located outside the vehicle during the triggering of the command. In this case, an appropriate application (App) can be used.

In one embodiment of the method, the possessor or legal owner can report his or her vehicle stolen with a terminal device, making use of the application. This is possible through a corresponding operator element (button), by which a stopping of the vehicle is automatically commanded. The command designed for this can be sent from the terminal device directly or via the server indirectly to the vehicle, i.e., to its controller. For this, it is possible to report a theft to the server. With the command, information is automatically provided to the controller of the vehicle that it has been unlawfully abducted. As soon as the safe condition is detected for the vehicle after receipt of the appropriate command, the at least one switch, such as the contactor, is opened.

With the described command, relayed to the controller, an opening of the at least one switch and thus a separating of the at least one electrical machine from the electrical energy source is ordered or initiated, so that this usually first command can also be designed or designated as an opening command and/or a separating command. In one embodiment, it is possible to provide an additional or usually second command, which is likewise relayed to the controller from the device outside and/or independent of the vehicle, whereupon the at least one switch is again closed by the controller and the at least one electrical machine is again connected to the electrical energy source when it has received this second command, this second command being designed or designated as a closing command and/or a connection command.

Of course, the above mentioned and the following features yet to be explained can be used not only in the respective indicated combinations, but also in other combinations or standing alone.

BRIEF DESCRIPTION OF THE SEVERAL VIEWS OF THE DRAWINGS

FIG. 1 shows in schematic representation an example of a vehicle for which one embodiment of a method can be carried out with an embodiment of a system.

DETAILED DESCRIPTION

The vehicle 2 shown schematically in FIG. 1 is designed here and designated as a motor vehicle and it comprises, as components, a controller 4, an electrical energy source 6 and an electrical machine 8. The embodiment of the system for this vehicle 2 comprises, besides the controller 4, also a switch 10, which is arranged between the electrical energy source 6 and the electrical machine 8.

It is provided here that the electrical energy source 6 and the electrical machine 8 comprise a high-voltage system. If the switch 10 located or arranged in between is closed, the electrical energy source 6 and the electrical machine 8 are electrically connected to each other. It is possible for the electrical energy source 6 and the electrical machine 8 to exchange electrical energy across the closed switch 10, the electrical machine 8 being provided with electrical energy from the electrical energy source 6, which is converted in turn by the electrical machine 8 into mechanical energy, and the vehicle 2 is driven or propelled with this mechanical energy of the electrical machine 8. If the switch 10 is or becomes open, a connection between the electrical energy source 6 and the electrical machine 8 is interrupted. The electrical energy source 6 is designed, e.g., as a high-voltage circuit and in one embodiment it is integrated in an onboard electrical network of the vehicle 2, which is operated on the high-voltage system, the electrical energy source 6 being usually designed as a battery or storage cell and thus being an electrical energy accumulator or a fuel cell.

Independently of this, the controller 4 is connected to an energy accumulator, not otherwise represented here, at a low-voltage system, by which the controller 4 is also supplied with electrical energy independently of the energy source 6 shown here.

FIG. 1 furthermore shows a mobile or portable terminal device 12 as a device which can also be used outside the vehicle 2 and independently of the vehicle 2. In the embodiment of the method which is presented here, it is provided that the vehicle 2 and the terminal device 12 belong to a possessor or owner. If the vehicle 2 is abducted and thus stolen from the possessor of the vehicle 2, he or she has the possibility, in the embodiment of the method, to use his or her terminal device 12 and relay a command 14 to the controller 4 of the vehicle 2 via a radio-based communication link. A signal for transporting this command 14 from a communication module of the terminal device 12 to a communication module of the vehicle 2 is sent by radio. The terminal device 12 is configured here as a further component of the proposed system.

As soon as the controller 4 has received the command 14, it checks the movement condition of the vehicle 2. If the controller 4, for example by evaluating the current operating parameters, such as kinematic parameters describing the movement of the vehicle 2, detects and/or demonstrates, with sensor support, that the vehicle 2 is stationary at least for a defined interval of time after its last movement and finds itself in a safe, nonmoving condition, the switch 10 between the electrical energy source 6 and the electrical machine 8 is opened and a driving, usually a continued driving of the vehicle 2, is prevented.

If the controller 4 receives the command 14 during the driving or movement of the vehicle 2, the controller 4 will open the switch 10, once the vehicle 2 has come to a stop, only after the expiration of the defined interval of time and only then prevent the further driving. It is provided that the vehicle 2 will only be in the safe, nonmoving condition if it is not moved or has not been moved at least during the defined interval of time, and in a further embodiment if it is or has been parked with a parking brake, for example.

German patent application no. 10 2021 116773.6, filed Jun. 30, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for preventing driving of an electric vehicle having an electrical energy source, at least one electrical machine that converts electrical energy supplied by the electrical energy source into mechanical energy that propels the electric vehicle, and at least one switch, wherein electrical energy is exchanged between the electrical energy source and the at least one electrical machine when the at least one switch is closed, the method comprising:

when the driving of the electric vehicle is to be prevented, relaying a command to prevent the driving of the electric vehicle to a controller of the electric vehicle;

upon receipt of the command by the controller, detecting, by the controller, whether the electric vehicle is in a safe condition, wherein the controller detects that the electric vehicle is in the safe condition in response to determining that a speed of the electric vehicle is zero after at least a defined time interval expires; and opening the at least one switch by the controller after detecting that the electric vehicle is in the safe condition.

2. The method according to claim 1, wherein the driving of the electric vehicle is prevented if the electric vehicle has been stolen.

3. The method according to claim 1, wherein the command is relayed from a device inside the electric vehicle to the controller of the electric vehicle.

4. The method according to claim 1, wherein the electrical energy source comprises a voltage system having a voltage level of at least 60 Volts.

5. A system for preventing driving of an electric vehicle having an electrical energy source and at least one electrical machine that converts electrical energy supplied by the electrical energy source into mechanical energy that propels the electric vehicle, the system comprising:

at least one switch arranged between the electrical energy source and the at least one electrical machine, wherein electrical energy is exchanged between the electrical energy source and the at least one electrical machine when the at least one switch is closed; and a controller;

wherein, when the driving of the electric vehicle is to be prevented, a command to prevent the driving of the electric vehicle is relayed to the controller, wherein the controller, in operation, receives the command and, upon receipt of the command, detects whether the electric vehicle is in a safe condition, wherein the controller detects that the electric vehicle is in the safe condition in response to determining that a speed of the electric vehicle is zero after at least a defined time interval expires, and opens the at least one switch after detecting that the electric vehicle is in the safe condition.

6. The system according to claim 5, wherein the at least one switch is a contactor.

7. The system according to claim 5, wherein the at least one switch is arranged in an access-secured housing and/or is installed in the electric vehicle inaccessible from outside of the electric vehicle.

8. The system according to claim 5, wherein the at least one switch is in a housing with an actuator that, in operation, automatically opens the at least one switch in response to an attempt to open the housing.

9. The method according to claim 1, wherein the at least one switch is in a housing with an actuator, and wherein the method further comprises automatically opening, by the actuator, the at least one switch in response to an attempt to open the housing.

10. The method according to claim 1, wherein the command is a first command transmitted by a terminal device that is outside of the electric vehicle, wherein the method further comprises:

when the driving of the electric vehicle is to be enabled, relaying a second command transmitted by the terminal device that is outside of the electric vehicle to the controller of the electric vehicle; and upon receipt of the second command by the controller, closing the at least one switch by the controller.

11. The system according to claim 5, wherein the command is a first command transmitted by a terminal device that is outside of the electric vehicle, wherein the controller, in operation:

when the driving of the electric vehicle is to be enabled, receives a second command transmitted by the terminal device that is outside of the electric vehicle; and upon receipt of the second command, closes the at least one switch by the controller.

* * * * *